United States Patent [19]

Uno et al.

[11] 4,014,000
[45] Mar. 22, 1977

[54] PATTERN RECOGNITION SYSTEM UTILIZING A PLURALITY OF PARTIAL STANDARD PATTERNS

[75] Inventors: Takeshi Uno, Sayama; Sadahiro Ikeda, Tokyo; Hirotada Ueda, Sayama, all of Japan

[73] Assignee: Hitachi, Ltd., Japan

[22] Filed: Mar. 29, 1976

[21] Appl. No.: 671,048

[30] Foreign Application Priority Data

Mar. 28, 1975  Japan .............................. 50-36758

[52] U.S. Cl. .............. 340/146.3 MA; 340/146.3 Q
[51] Int. Cl.² ........................................ G06K 9/08
[58] Field of Search ............ 340/146.3 Q, 146.3 H, 340/146.3 AQ, 146.3 MA

[56] References Cited
UNITED STATES PATENTS

| | | | |
|---|---|---|---|
| 3,613,080 | 10/1971 | Angeloni et al. | 340/146.3 MA |
| 3,898,617 | 8/1975 | Kashioka et al. | 340/146.3 MA |
| 3,905,018 | 9/1975 | Gray | 340/146.3 Q |
| 3,959,771 | 5/1976 | Uno et al. | 340/146.3 H |

Primary Examiner—Joseph M. Thesz
Attorney, Agent, or Firm—Craig & Antonelli

[57] ABSTRACT

A pattern recognition system comprises a picture tube for picking up an object to be recognized, a partial image pattern cutting out apparatus which, in turn, outputs a plurality of partial image patterns cut out from an image pattern obtained from the picture tube, the partial image patterns being output in synchronization with the scanning of the picture tube and a memory storing a plurality of partial standard patterns. Each of the partial image patterns is compared with the respective partial standard patterns and the respective partial image patterns similar to each partial standard pattern are grouped every partial standard pattern. A group of the partial image patterns, each of which is closely spaced from each other in a position of two-dimensional coordinate is selected from each group of the grouped partial image patterns and the respective representative positions of the respective elected groups of the partial image patterns are calculated. The shape and the position of the object to be recognized can be detected from the fact that the respective representative positions are closely spaced from each other in a position of a two-dimensional coordinate.

9 Claims, 18 Drawing Figures

4,014,000

PATTERN RECOGNITION SYSTEM UTILIZING A PLURALITY OF PARTIAL STANDARD PATTERNS

BACKGROUND OF THE INVENTION

This invention relates to a pattern recognition system for detecting the shape and the position of an object, and more particularly to a pattern recognition system which can recognize an object having a complicated shape or not being completely equivalent to a standard pattern.

Automatic assembly apparatus and automatic article suppliers have been developed and installed in factories in order to automatically manufacture products, some of which provide pattern recognition systems. Signals produced from the pattern recognition systems and corresponding to the shape and the position of an object are utilized to control the automatic assembly apparatus and the automatic article suppliers.

Now, in the conventional pattern recognition system, an object to be recognized in an image pattern which is obtained from a picture tube, has been compared with a standard pattern equivalent to the object in shape, so that a presence and a position of the object in the image pattern has been detected in a fact that the partial pattern of the image pattern is placed in registration with the standard pattern. It has been, however, necessary that this pattern recognition system has a mask, which will be explained hereinafter, for enough covering of the standard pattern and a large volume of memory corresponding to the size of the mask in order to store the information of the mask. Further, a case where the shape of the object to be recognized in the image pattern is deformed by some cause has a low degree of similarity between the object and the standard pattern since the standard pattern is formed from one mask, and the pattern recognition system results in errors in the recognition of the object. This is one example, which in a case where the object to be recognized is a circle, the size of the circle picked up as an image is variable due to a distance between the circle as the object and the picture tube and the shape thereof is an ellipse when the picture tube is shifted from the axis of the circle, so that the circle cannot be recognized.

SUMMARY OF THE INVENTION

An object of this invention is to provide a pattern recognition system which can recognize an object, even if the picked-up pattern of the object is somewhat deformed.

Another object of this invention is to provide a pattern recognition system which can recognize an object having a complicated shape or not being completely equivalent to a standard pattern.

Further, an object of this invention is to provide a pattern recognition system having a small volume of memory in comparison with a conventional pattern recognition system.

Still further, an object of this invention is to provide a pattern recognition system which is flexible in an operation thereof, so that this pattern recognition system can recognize not only an object having a predetermined shape and size, but also an object, the portions of which is similar to a standard pattern, for instance, the object is an ellipse and the standard pattern is a circle, or is rectangular, or is a square.

In order to achieve the above objects, a pattern recognition system of this invention includes a partial image pattern cut-out circuit, by which partial image patterns, in turn, are cut out from an image pattern picked up by a picture tube and output in synchronization with the scanning of the picture tube, memories storing a plurality of partial standard pattern which are a whole or portions of a divided standard pattern, a grouping apparatus, by which the partial image patterns are grouped to each group of the partial image pattern similar to each partial standard pattern, and a discriminating apparatus which further extracts a group relating to an object to be recognized from each group of the partial image pattern, whereby the shape and the position of the object can be recognized.

The above and other objects and advantages of this invention will be apparently understood from the following description in connection with the following drawings.

DESCRIPTION OF THE PREFERRED EMBODIMENTS

Figure 1:
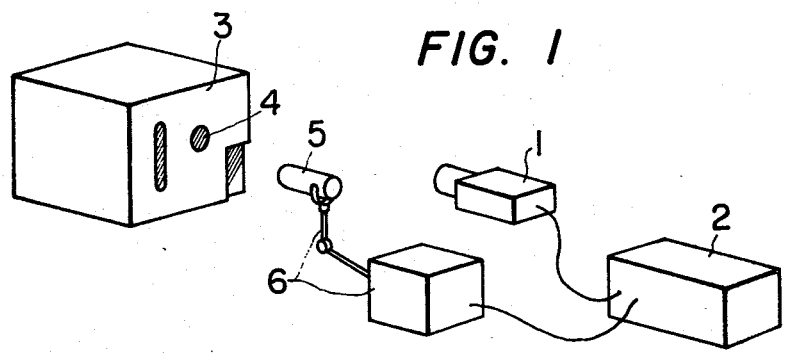
FIG. 1 is a schematic perspective view of an automatic assembly apparatus with a pattern recognition system.
Figure 2:
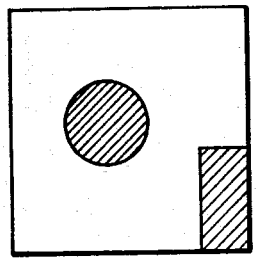
FIG. 2 is a plane view of the surface of an object.

FIG. 1 shows an automatic assembly control apparatus to which a pattern recognition system of this invention is applied. In FIG. 1 a picture tube 1 picks up one face of a workpiece 3 so that the picture tube 1 converts an image pattern shown in FIG. 2 into an electric signal and inputs to an image processing apparatus 2. The image processing apparatus 2 recognizes the shape and the position of a hole 4 in the workpiece 3 and produces a control signal to control a manipulator 6 which inserts automatically a member 5 such as a bolt held by the arm of the manipulator 6 into the hole 4.

Now, a signal from the picture tube 1 to the image processing apparatus 2 is normally sampled for digital processing. For example, in a standard TV system, the signal from the picture tube has already sampled the image by scanning lines of 525 in a vertical direction. According, the image is also sampled by a sampling circuit in a horizontal direction. Although this is, of course, a case where a picture tube of an electron beam scanning type is used, a sampling is not necessary in a solid state image pick-up device such as a charge coupled device (well known as CCD) which solid state detecting elements are arranged in two dimensions since already sampled signals are obtained from the respective detecting elements arranged in longitudinal and transverse directions.

The image sampled, as has been described above, is shown in FIG. 3, for instance. This example is illustrated as a simple model wherein 16 pieces of picture elements are arranged in vertical and horizontal directions, respectively. Further, the brightness of the picture element is represented by binary levels, i.e., 1 for a bright picture element and 0 for a dark picture element, though it is generally multilevels. Therefore, in the simple model of FIG. 3, a hatching portion corresponds to 0 and the other portion 1. X and Y represent axes of two dimensional coordinate system.

A principle of this invention will be explained below in connection with FIGS. 3 and 4. One of the great features of this invention to utilize a plurality of partial standard patterns, each of which is divided from a standard pattern. In more detail, when it is assumed that the standard pattern for recognizing the hole 4 of the workpiece 3 in FIG. 1 corresponds to a mask surrounded by a large width solid line in FIG. 3, a plurality of the partial standard patterns correspond to partial patterns A, B, C, and D in FIG. 4, each of which hereinafter names a substandard pattern A, B, C, or D and has 16 pieces of picture elements. In this example, the standard pattern is divided into four pieces of the substandard patterns, but in general, it can be divided into n pieces of the substandard patter, where $n \geq 2$. Further, it is not necessary that all of n pieces of the substandard pattern are used to recognize the object, but some of the n pieces of the substandard pattern may be used.

Figure 3:
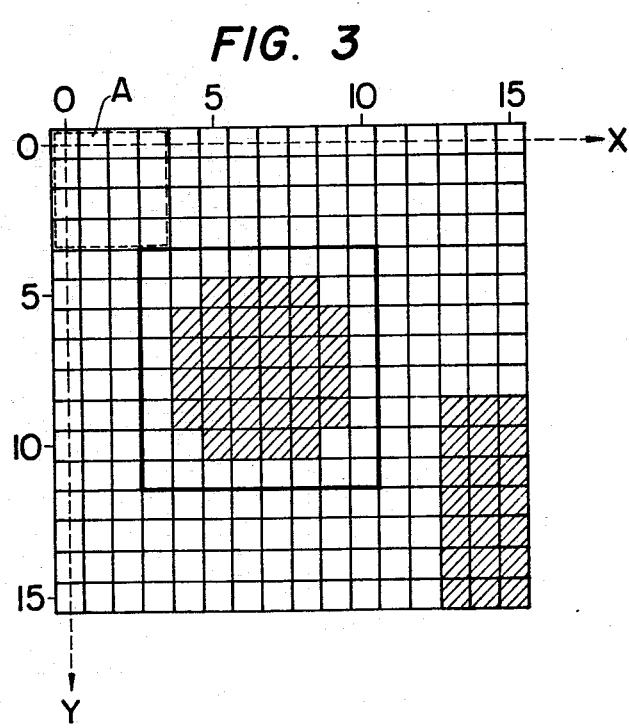
FIG. 3 is a diagram of an image pattern.
Figure 4:
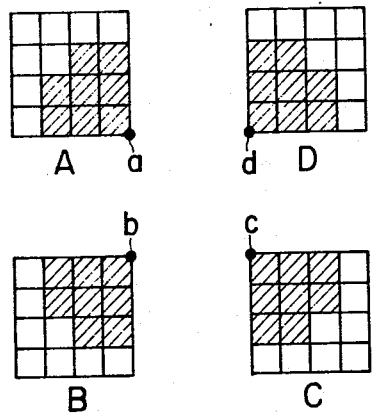
FIG. 4 shows substandard patterns applied to this invention.
Figure 5A:
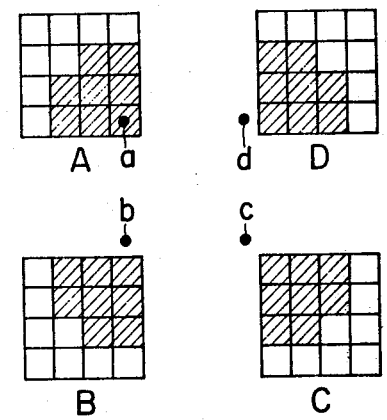
FIGS. 5a and 5b show modified substandard patterns.
Figure 5B:
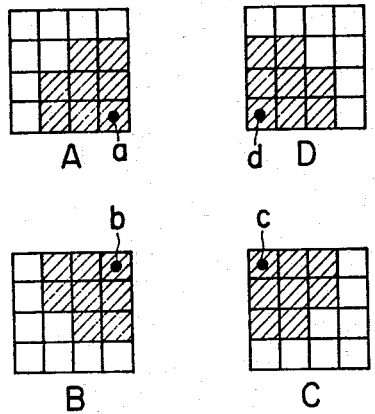

Now, first of all, the substandard pattern A of FIG. 4 is superposed on the image pattern in FIG. 3 at an arbitrary position thereof, such as the dotted substandard pattern A is superposed on the image pattern at a left-upper portion thereof, for instance, and then each picture element of the substandard pattern A is compared with each picture element of the image pattern on which the substandard pattern A is superposed and a number of the picture elements is counted, that the content 1 or 0 of the picture element of the substandard pattern A agrees with the content 1 or 0 of the picture element of the image pattern. This number of the picture elements represents a measure for a degree of similarity between the substandard pattern A and the image pattern on which the substandard pattern A is superposed. Accordingly, the high degree of similarity between both patterns can be discriminated due to whether this number is greater than a predetermined number $N_{min}$ or not, in other words, whether a number of picture elements that the content of the picture element of the standard pattern A does not agree to the content of the picture element of the image pattern is smaller than a predetermined number $N_{max}$. The predetermined numbers $N_{min}$ and $N_{max}$ depend upon the pitch of the sampling, the quality of the image and the shape of the object, etc., and are selected experimentally. For simple explanation, the number of the picture elements corresponding to disagreement, hereinafter, will be used. As a result of comparison between both patterns described above, when the number of the picture elements corresponding to disagreement is smaller than the predetermined number $N_{max}$, the relationship between the positions of both patterns is stored; whereas, when the number of the picture elements corresponding to disagreement is larger, the relationship between the positions of both patterns is omitted storing. Such comparison as described above is carried out by changing the position of the substandard pattern A on the image pattern in FIG. 3 thereover. The substandard pattern A, for instance, in turn, is shifted by one pitch of the sampling in the X direction or in the Y direction. Now, in order to store the above relationship, one position, for example, a position $a$, in the substandard pattern A is selected, i.e., the position $a$ represents the position of the substandard pattern A as shown in FIG. 4, as well as positions $b$, $c$, and $d$ represents the positions of the substandard patterns B, C, and D, respectively. Any position representative of the subpattern can be selected as shown in FIGS. 5a and 5b, for instance. In this embodiment of FIG. 4, the positions $a$, $b$, $c$, and $d$ representative of the substandard patterns A, B, C, and D are selected to the center of the hole 4 to be recognized. In the same manner, the substandard patterns B, C, and D are compared with the image pattern, respectively, and the results of these comparisons are stored.

A table 1 shows the results which have compared the respective substandard patterns A, B, C, and D with the image pattern, in which the position (X,Y) is of the positions $a$, $b$, $c$, and $d$ in the X-Y coordinate system; N is the number of the picture elements corresponding to disagreement; and the predetermined number $N_{max}$ is 3.

Next, a way how the presence and the position of the hole 4 to be recognized are detected from the information of the table 1 will be explained. There are two methods for the recognition of the hole.

TABLE 1

| Data No. | Type of Substandard Pattern | X | Y | N |
| --- | --- | --- | --- | --- |
| 1 | A | 6.5 | 6.5 | 3 |
| 2 | A | 7.5 | 6.5 | 3 |
| 3 | A | 5.5 | 7.5 | 3 |
| 4 | A | 6.5 | 7.5 | 0 |
| 5 | A | 7.5 | 7.5 | 3 |
| 6 | A | 5.5 | 8.5 | 3 |
| 7 | A | 6.5 | 8.5 | 3 |
| 8 | A | 15.5 | 10.5 | 2 |
| 9 | A | 14.5 | 11.5 | 2 |
| 10 | A | 15.5 | 11.5 | 1 |
| 11 | B | 5.5 | 6.5 | 3 |
| 12 | B | 6.5 | 6.5 | 3 |
| 13 | B | 5.5 | 7.5 | 3 |
| 14 | B | 6.5 | 7.5 | 0 |
| 15 | B | 7.5 | 7.5 | 3 |
| 16 | B | 6.5 | 8.5 | 3 |
| 17 | B | 7.5 | 8.5 | 3 |
| 18 | C | 6.5 | 6.5 | 3 |
| 19 | C | 7.5 | 6.5 | 3 |
| 20 | C | 5.5 | 7.5 | 3 |
| 21 | C | 6.5 | 7.5 | 0 |
| 22 | C | 7.5 | 7.5 | 3 |
| 23 | C | 5.5 | 8.5 | 3 |
| 24 | C | 6.5 | 8.5 | 3 |
| 25 | D | 5.5 | 6.5 | 3 |
| 26 | D | 6.5 | 6.5 | 3 |
| 27 | D | 5.5 | 7.5 | 3 |
| 28 | D | 6.5 | 7.5 | 0 |
| 29 | D | 7.5 | 7.5 | 3 |
| 30 | D | 6.5 | 8.5 | 3 |
| 31 | D | 7.5 | 8.5 | 3 |

A first method for the recognition of the hole will be explained below. First, respective distances between partial image patterns shown by data No. in the table 1 are calculated for every type of the substandard pattern, and the partial image patterns are grouped to respective groups, each of which is within a predetermined distance $L_{max}$ in the distance therebetween. The predetermined distance $L_{max}$ depends upon the pitch of the sampling and the shape of the object, etc., and is selected experimentally. Now, assuming that the predetermined distance $L_{max}$ is 3 in this embodiment, the partial image patterns are grouped into five groups as follows:

Group $A_1$: data Nos. 1 to 7
Group $A_2$: data Nos. 8 to 10
Group $B_1$: data Nos. 11 to 17
Group $C_1$: data Nos. 18 to 24
Group $D_1$: data Nos. 25 to 31

Next, the average positions (X,Y) of the respective groups $A_1$ through $D_1$ in the X-Y coordinate system are calculated as follows:

Group $A_1$: X = 6.5, Y = 7.5
Group $A_2$: X = 15.2, Y = 11.2
Group $B_1$: X = 6.5, Y = 7.5
Group $C_1$: X = 6.5, Y = 7.5
Group $D_1$: X = 6.5, Y = 7.5

Next, respective distances between the average coordinate positions of the respective groups $A_1$ through $D_1$ are calculated and the groups are further grouped to respective groups, each of which is within a predetermined distance $M_{max}$ in the distance therebetween. The predetermined distance $M_{max}$ depends upon the pitch of the sampling and the shape of the object, etc., and is selected experimentally. Now, assuming that the predetermined distance $M_{max}$ is 3 in this embodiment, the respective groups $A_1$ through $D_1$ are grouped into groups 1 and 2 as follows:

Group 1: Groups $A_1$, $B_1$, $C_1$, and $D_1$
Group 2; Group $A_2$

Then, it is discriminated whether or not the respective Groups 1 and 2 include all of the Groups $A_1$, $B_1$, $C_1$, and $D_1$ corresponding to the respective substandard patterns A, B, C, and D, so that the Group 1 is elected and the presence of the hole in the image pattern is detected.

Next, an average position of the positions representative of the Groups $A_1$, $B_1$, $C_1$, $D_1$ is calculated, the average position corresponding to the center position of the hole in the X-Y coordinate system. This calculation is made as follows:

Average position: $X_A = 6.5$, $Y_A = 7.5$

As a result, the presence and the position of the hole 4 in FIG. 1 can be recognized.

The first method for the recognition of the hole is not limited to the way described above, but various modifications can be accepted. One modification relates to the representative positions a, b, c, and d of the substandard patterns A, B, C, and D, that is, the representative positions a, b, c, and d can be selected as shown in FIG. 5a or 5b, for instance. When the representative positions a, b, c, and d are selected as shown in FIG. 5a wherein they place at one position in a case where the substandard patterns A, B, C, and D compose one standard pattern, the average position of the positions representative of the Groups $A_1$, $B_1$, $C_1$, and $D_1$ which is calculated in the last step of the above first method, shifts from the center position of the hole. Therefore, it is necessary to compensate this average position in order to obtain the center position of the hole. In the case of FIG. 5a, the average position is shifted by 0.5 in the X direction and by 0.5 in the Y direction.

The representative positions a, b, c, and d may not always place at one position in a case where the substandard patterns A, B, C, and D compose one standard pattern, for instance, they may be selected as shown in FIG. 5b, wherein they are symmetrically placed with respect to the center position of the standard pattern, and the average position of the positions representative of the group $A_1$, $B_1$, $C_1$, and $D_1$, itself represents the center position of the hole, where the compensation is not needed. In this case, the predetermined distance $M_{max}$ may be selected larger than the previous case since the representative positions a, b, c, and d are far from each other.

Figure 6:
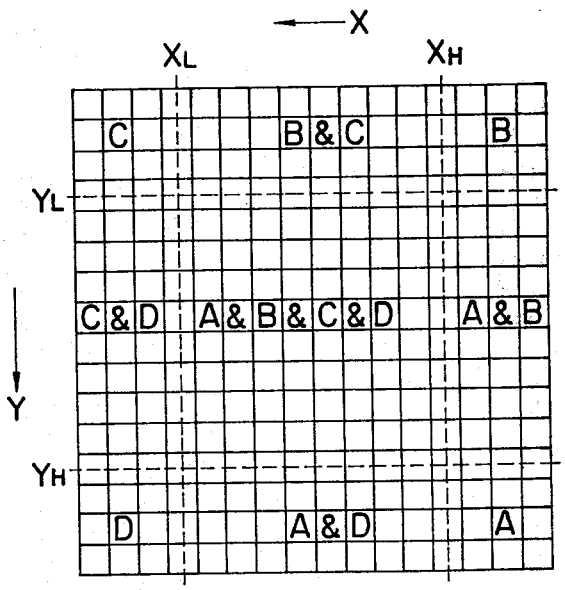
FIg. 6 is a diagram showing a position relationship between the image pattern and the substandard patterns.

Another modification relates to a way of discrimination of the hole. The presence of the hole in the image pattern is detected by the fact that all of the Groups $A_1$, $B_1$, $C_1$, and $D_1$ corresponding to the substandard patterns A, B, C, and D are output finally in the above first method. When the hole on the portion thereof is, however, placed in the surrounding portion of the image pattern, it cannot be recognized as the hole or the portion thereof by the above way. In order to prevent this problem, the following step must be taken. The pattern recognition system is preset that the hole or the portion thereof places in a predetermined portion of the image pattern when the specific substandard pattern matches with the partial image patterns of the predetermined portion thereof, each of which is, of cause, selected within the predetermined distance $L_{max}$ in the distance therebetween. For example, it can be detected that the portion of the hole places in the leftmost-upper portion of the image pattern when a group of the partial image patterns corresponding to the substandard pattern C places therein. In other words, the portion of the hole does not place in the leftmost-upper portion of the image pattern even if either one of groups of the partial image patterns corresponding to the other substandard pattern A, B, and D places therein. Similarly, it can be detected that the portion of the hole places in the rightmost-upper portion of the image pattern when a group of the partial image patterns corresponding to the substandard pattern B places therein, and that the portion of the hole places in the middle-lower portion of the image pattern when groups of the partial image patterns corresponding to the substandard patterns A and D place therein. Accordingly, the relationship between the position of the hole and the substandard patterns A, B, C, and D is shown in FIG. 6 over the whole image pattern, wherein A, B, C, and D represent the substandard patterns, respectively.

Next, a second method for the recognition of the hole will be explained below. First, the partial image patterns shown by data No. in the table 1 are grouped for every type of the substandard pattern such as the Groups $A_1$, $A_2$, $B_1$, $C_1$, and $D_1$ in the first method, for instance. Then, the partial image pattern which the number N is the smallest is selected from the group of the partial image patterns, the position of the partial image pattern representing the approximate position of the grouped partial image patterns. If a number of the partial image patterns which the number N is the smallest is more than two, an average position therebetween is calculated and the average position represents the approximate position of the grouped partial image patterns. The position of the partial image pattern representing the approximate position of the grouped partial image patterns is obtained as follows referring to the table 1:

Group $A_1$; data No. 4, X = 6.5, Y = 7.5
Group $A_2$; data No. 10, X = 15.5, Y = 11.5
Group $B_1$; data No. 14, X = 6.5, Y = 7.5

Group $C_1$; data No. 21, X = 6.5, Y = 7.5
Group $D_1$; data No. 28, X = 6.5, Y = 7.5

The respective representative positions of the grouped partial image patterns as described above are not always positioned in coincidence with the respective representative average positions of the grouped partial image patterns in the first method, but the difference therebetween is very small. Therefore, to use the second method is better from a view point of a simple apparatus for the pattern recognition.

Next, respective distances between the representative positions of the respective groups $A_1$ through $D_1$ are calculated and the groups $A_1$ through $D_1$ are further grouped to respective groups, each of which is within the predetermined distance $M_{max}$ in the distance therebetween, as well as the case of the first method. Then, the presence of the hole is detected and the position thereof is calculated, wherein these descriptions are omitted since they are similar to those of the first method.

Although the principle of this invention has been explained in the case where the object to be recognized is the hole, it is applicable to any type of an object, which is a ring shape, a square shape, a rectangular shape, an asymmetrical shape or a complicated shape. Furthermore, the principle of this invention is applicable to a recognition for any size of an object and to a case where a pickedup image deforms due to that the predetermined distances $L_{max}$ and $M_{max}$, and the predetermined number $N_{max}$ are set with certain values, which, for instance, may be larger than the previous cases, since the plurality of the substandard patterns or the portions thereof are utilized for the pattern recognition. Still further, even if the portion of the object to be recognized is only picked up by the picture tube, this invention can recognize that this portion is of the object, whereby information for controlling a filed of view of the picture tube or a movement of the object is obtained.

Next, embodiments of this invention will be explained in connection with the drawing in more detail.

Figure 7:
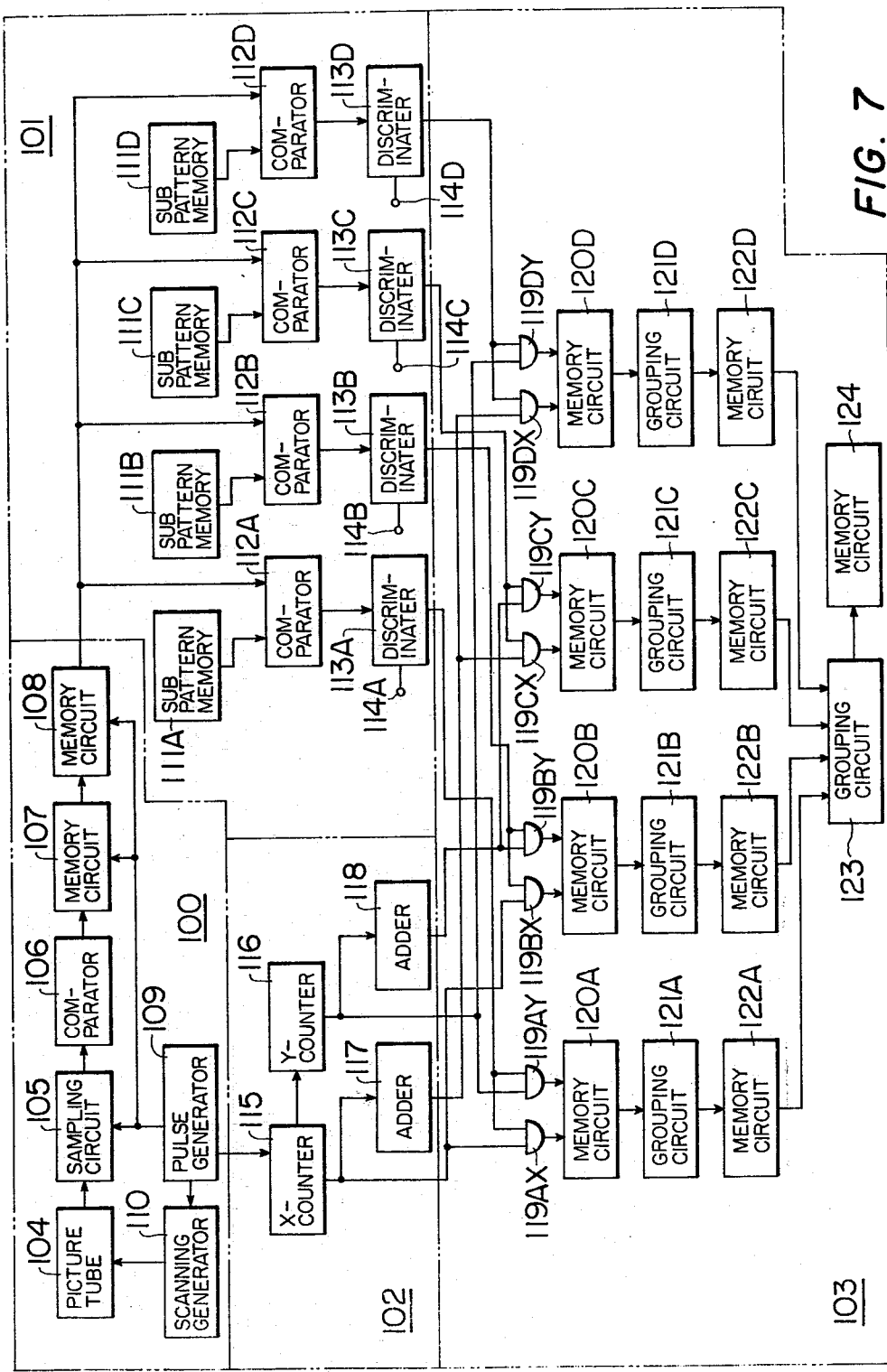
FIG. 7 is a schematic block diagram of an embodiment of this invention.

Referring now to FIG. 7, a reference numeral 100 designates a partial image pattern cut out circuit, 101 a discriminating circuit for the partial image pattern, 102 an X-Y position generating circuit and 103 a detecting circuit of an object. The partial image pattern cut out circuit 100 comprises a picture tube 104 for picking up an object to be recognized, a sampling circuit 105 separating a continuous picture signal into respective picture elements as shown in FIG. 3, a comparator 106 converting the each picture element into a binary signal 1 or 0 in response to the brightness of the each picture element as described previously, memory circuits 107 and 108, a pulse generator 109 and a scanning signal generator 110 for the picture tube 104. As well as a conventional picture tube, the picture tube 104 sequentially outputs an image signal due to horizontal and vertical scanning signals from the scanning signal generator 110. The sampling circuit 105, to which the sequential image signal is supplied from the picture tube 104, is timed by timing pulses from the pulse generator 109, the frequency of which is, for example, 6 MHz. In this case, a number of the picture elements is 382 pieces of picture elements in a horizontal direction and 262 pieces of picture elements in a vertical direction, so that there are 382 × 262 pieces of picture elements in the whole image pattern. However, for simple explanation, the sampled image pattern, which has a few picture elements, in FIG. 3 is utilized. Therefore, it is needless to say that a number of the picture elements in the actual pattern recognition system is greater than that of the sampled image pattern in FIG. 3.

The output of the sampling circuit 105 is supplied to the shift registers 107 and 108 through the comparator, in which the sampled image signal is converted into a binary signal 1 or 0 in accordance with the brightness of the picture element. The threshold of the comparator 106 depends upon the quality of the image and an illumination, etc., and is so selected experimentally that the object is distinguished from the background. Although either one of the bright picture element and the dark picture element can correspond to either one of the binary signals 1 and 0, it is assumed that the bright picture element corresponds to the binary signal 1 whereas the dark one corresponds to the binary signal 0 in this embodiment. In addition, the order of the sampling and the comparison can change. Further, the sampling circuit 105 is omitted when the solid state image pick-up device such as CCD is used as the picture tube.

Figure 8:
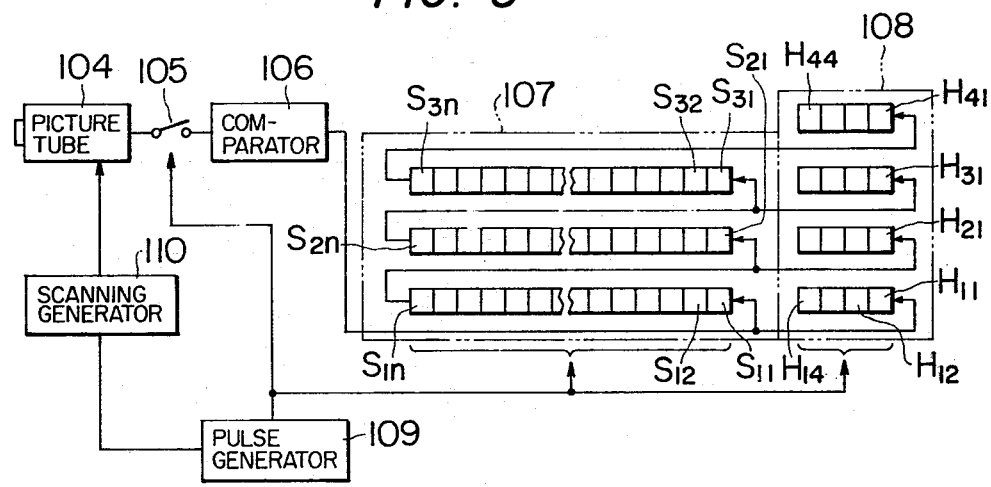
FIGS. 8 and 9 are detailed circuit diagrams of the portions of the embodiment shown in FIG. 7.

The memory circuits 107 and 108 are shown in FIG. 8 in more detail, in which the same elements as those in FIG. 7 are designated by the same reference numerals. The memory circuit 107 comprises a plurality of serially connected shift registers $S_{11}, S_{12}, \ldots, S_{21}, \ldots, S_{3n}$, such as flip-flop circuits, each of which is timed by the timing pulses from the pulse generator 109. The output of the comparator 106 is first supplied to the shift register $S_{11}$ in which the image information of the one picture element is temporarily stored and the content of the shift register $S_{11}$ is shifted by the timing pulse to the next shift register $S_{12}$. Similarly, the image information, in turn, is shifted in the order of $S_{12}, S_{13} \ldots S_{1n} \ldots S_{3n}$, in response to the timing pulses. The number of shift registers $S_{11}$ through $S_{1n}$ corresponds to that of the picture elements in one horizontal scanning line. Although the memory circuit 107 has three lines of shift registers corresponding to the three horizontal scanning lines in this embodiment, the pattern recognition system of this invention is not limited in this arrangement, and a number of lines of shift registers in the memory circuit 107 is selected due to the size of the substandard pattern.

The memory circuit 108 comprises a plurality of serially connected shift registers $H_{11}, H_{12}, \ldots, H_{44}$, such as flip-flop circuits, each of which is timed by the timing pulses from the pulse generator 109 as well. The memory circuit 108 operates to cut out the partial image pattern from the image pattern, and the number and the arrangement of the shift registers therein correspond to the substandard pattern. The outputs of the comparator 106 and the shift registers $S_{1n}, S_{2n}$, and $S_{3n}$ are supplied to the shift registers $H_{11}, H_{21}, H_{31}$, and $H_{41}$, respectively, the respective contents of which, in turn, are shifted by the timing pulse to the next shift registers. In addition, the operations and the configurations of the memory circuits 107 and 108 are explained in U.S. Pat. No. 3,887,762 in more detail.

The discriminating circuit 101 for the partial image pattern comprises substandard pattern memories 111A, 111B, and 111C, and 111D, comparators 112A, 112B, 112C, and 112D, and discriminators 113A, 113B, 113C, and 113D. The substandard pattern memories 111A, 111B, 111C, and 111D store the substandard patterns A, B, C, and D, respectively, shown in FIG. 4, for instance, wherein the hatching portions thereof are stored in registers (not shown) as the binary signal 0 and the other portions thereof are stored in registers (not shown) as the binary signal 1. The respective comparators 112A, 112B, 112C, and 112D compare the partial image pattern cut out by the memory circuit 108 with the respective substandard patterns A, B, C, and D in the substandard pattern memories 111A, 111B, 111C, and 111D. The comparison between the partial image pattern and the substandard pattern, for instance, is carried out in the comparator 112A in the comparison between the content of each register of the memory circuit 108 and the content of each register of the substandard pattern memory 111A. As a result, the number of the picture elements corresponding to disagreement between the partial image pattern and the substandard pattern A is outputted from the comparator 112A. The number of the picture elements from the comparator 112A may be a number of pulses or a voltage level corresponding thereto. The comparators 112B, 112C, and 112D operate in the same manner.

The outputs of the comparators 112A, 112B, 112C, and 112D are supplied to the discriminators 113A, 113B, 113C, and 113D, respectively, to each of which the predetermined number $N_{max}$ is set by each terminal 114A, 114B, 114C, or 114D. The predetermined number $N_{max}$ set in each discriminator may be different from each other in accordance with the type of the substandard pattern. Each discriminator outputs gate signals in order to store the X-Y coordinate position of the partial image pattern in a case where the number of the picture element from each comparator is smaller than $N_{max}$. The above operations are performed within a period of the sampling and every sampling pulse.

Figure 9:
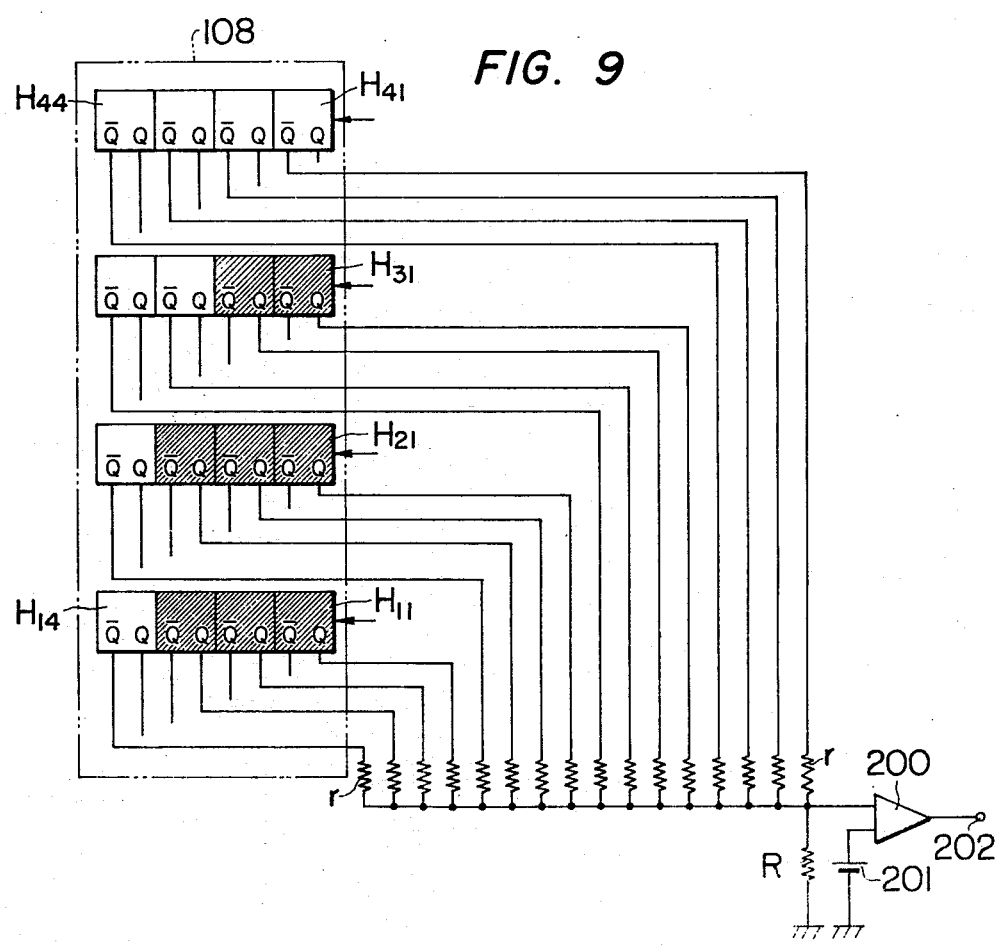

FIG. 9 shows one example of the discriminating circuit 101, in more detail, comprising the substandard pattern memory 111A, the comparator 112A, and the discriminator 113A. The substandard pattern memory 111A is not always constructed by the registers as has been described, and can be formed by the connection between the shift registers of the memory circuit 108 and the output lines therefrom as shown in FIG. 9. In FIG. 9 the shift registers of the memory circuit 108 are illustrated in more detail. Each of the shift registers $H_{11}$ through $H_{44}$ has two output terminals Q and $\bar{Q}$ when they are the flip-flop circuits. When the shift register stores the image information 1, the output terminal Q thereof outputs a signal 1 and the output terminal $\bar{Q}$ thereof outputs a signal 0, whereas when the shift register stores the image information 0, the output terminal Q thereof outputs the signal 0 and the output terminal $\bar{Q}$ thereof outputs the signal 1. Accordingly, in order to form the substandard pattern memory 111A, the terminal $\bar{Q}$ of the shift register which is placed at the position corresponding to 1 (the hatching portion in FIG. 4) of the substandard pattern A is connected to a comparator 200 through a resistor $\nu$, and the terminal Q of the shift register which is placed at the position corresponding to 0 (the other portion in FIG. 4) of the substandard pattern A is connected to the comparator 200 through a resistor $\nu$, whereby the substandard pattern memory 111A for the substandard pattern A in FIG. 4 can be realized. By the above construction, the voltage corresponding to the number of picture elements which the partial image pattern does not agree with the substandard pattern A is supplied to the comparator 200 since the output voltage of the memory circuit 108 is divided by the resistors $\nu$ and a resistor R. For example, when the partial image pattern agrees with the substandard pattern A, as shown in FIG. 9, the output voltage of the memory circuit 108 is a zero. But, when there are picture elements corresponding to disagreement, all of the shift registers corresponding to these picture elements output signal 1, respectively, so that the sum of these signals is supplied to the comparator 200. The discriminator 113A comprises the comparator 200 and a D.C. source 201. The D.C. source 201 sets a reference voltage for the threshold of the comparator 200, which corresponds to the predetermined number $N_{max}$. Therefore, when the output of the memory circuit 108 is smaller than $N_{max}$ the comparator 200 outputs the gate pulse from an output terminal 202. In the same manner, the substandard pattern memories 111B, 111C, and 111D, the comparators 112B, 112C, and 112D, and the discriminators 113B, 113C, and 113D are composed, where the shift registers $H_{11}$ through $H_{44}$ of the memory circuit 108 are commonly used.

The position generator 102, which illustrates positions of the representative positions, $a, b, c,$ and $d$ of the substandard patterns A, B, C, and D on the image pattern in FIG. 3, comprises an X-position and a Y-position counters 115 and 116, and an X-position compensating and a Y-position compensating adders 117 and 118. The X-position counter 115 counts the sampling pulses from the pulse generator 109 and illustrates the X-position of the representative position $a$ of the substandard pattern A in the X-Y coordinate system, where the X-position counter 115 is so designed that the representative position $a$ is shifted by 0.5 in the X axial direction in the substandard pattern A shown in FIG. 4, for instance. On the other hand, the Y-position counter 116 counts the output pulses from the X-position counter 115 corresponding to the horizontal synchronizing pulses and illustrates the Y-position of the representative position $a$ of the substandard pattern A in the X-Y coordinate system, where the Y-position counter 116 is so designed that the representative position $a$ is shifted by 0.5 in the Y axial direction in the substandard pattern A shown in FIG. 4, for instance. The X and Y position compensating adders 117 and 118 are provided to compensate the representative positions $b, c,$ and $d$ of the substandard patterns B, C, and D with respect to the representative position $a$ of the substandard pattern A. In a case, for example, where the substandard patterns A, B, C, and D in FIG. 4 are used, the X-position from the X-position counter 115 is shifted by 4 sampling pulses in the negative X axial direction by the X-position compensating adder 117 and the Y-position from the Y-position counter 116 is shifted by 4 sampling pulses in the negative Y axial direction by the Y-position compensating adder 118, i.e., the compensation of the each representative positions $b(X_b, Y_b)$, $c(X_c, Y_c)$ or $d(X_d, Y_d)$ is performed as follows, with respect to the representative position $a(X_a, Y_a)$.

$$\begin{cases} X_B = X_A \\ Y_B = Y_A - 4 \end{cases} \quad \begin{cases} X_C = X_A - 4 \\ Y_C = Y_A - 4 \end{cases} \quad \begin{cases} X_D = X_A - 4 \\ Y_D = Y_A \end{cases}$$

Next, the recognizing circuit 103 will be explained below. The output of the discriminator 113A opens gate circuits 119AX and 119AY in order to write the X-position from the X-position counter 115 and the Y-position from the Y-position counter 116 in a memory circuit 120A when the degree of the similarity between the partial image pattern and the substandard pattern A is smaller than $N_{max}$. Similarly, the output of the discriminator 113B opens gate circuits 119BX and 119BY in order to write the X-positions from the X counter 115 and the Y-position from the adder 118 in a memory circuit 120B, and the output of the discriminator 113C opens gate circuits 119CX and 119CY in order to write the X-position from the adder 117 and the Y-position from the adder 118 in a memory circuit 120C, and the output of the discriminator 113D opens gate circuits 119DX and 119DY in order to write the X-position from the adder 117 and the Y-position from the Y-counter 116 in a memory circuit 120D.

Figure 10:
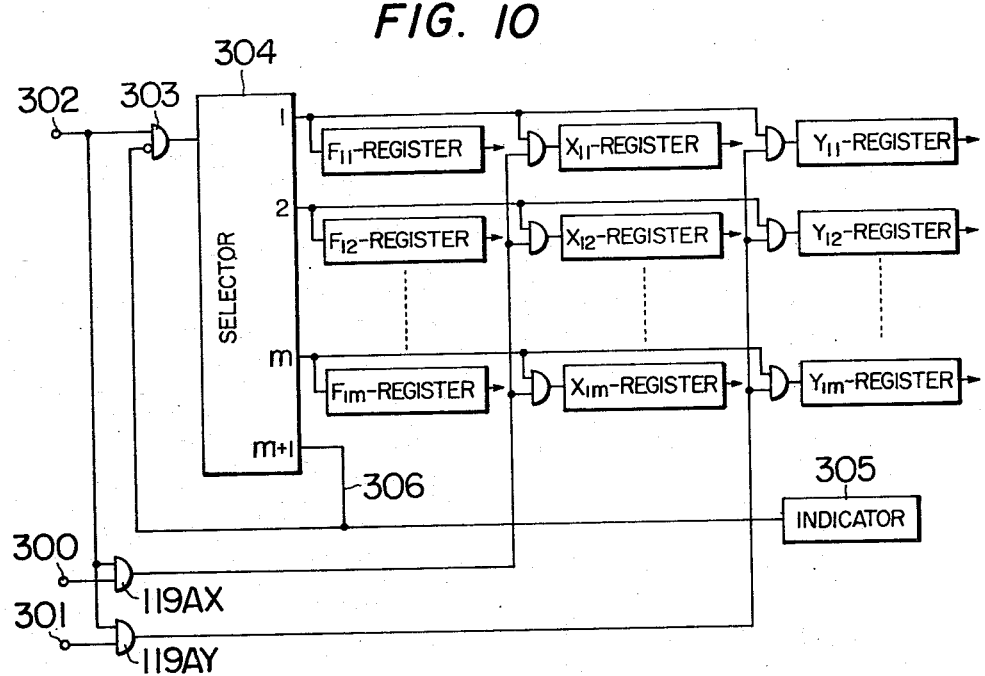
FIGS. 10 to 12 are detailed block diagrams of the portions of the embodiment shown in FIG. 7.
Figure 11:
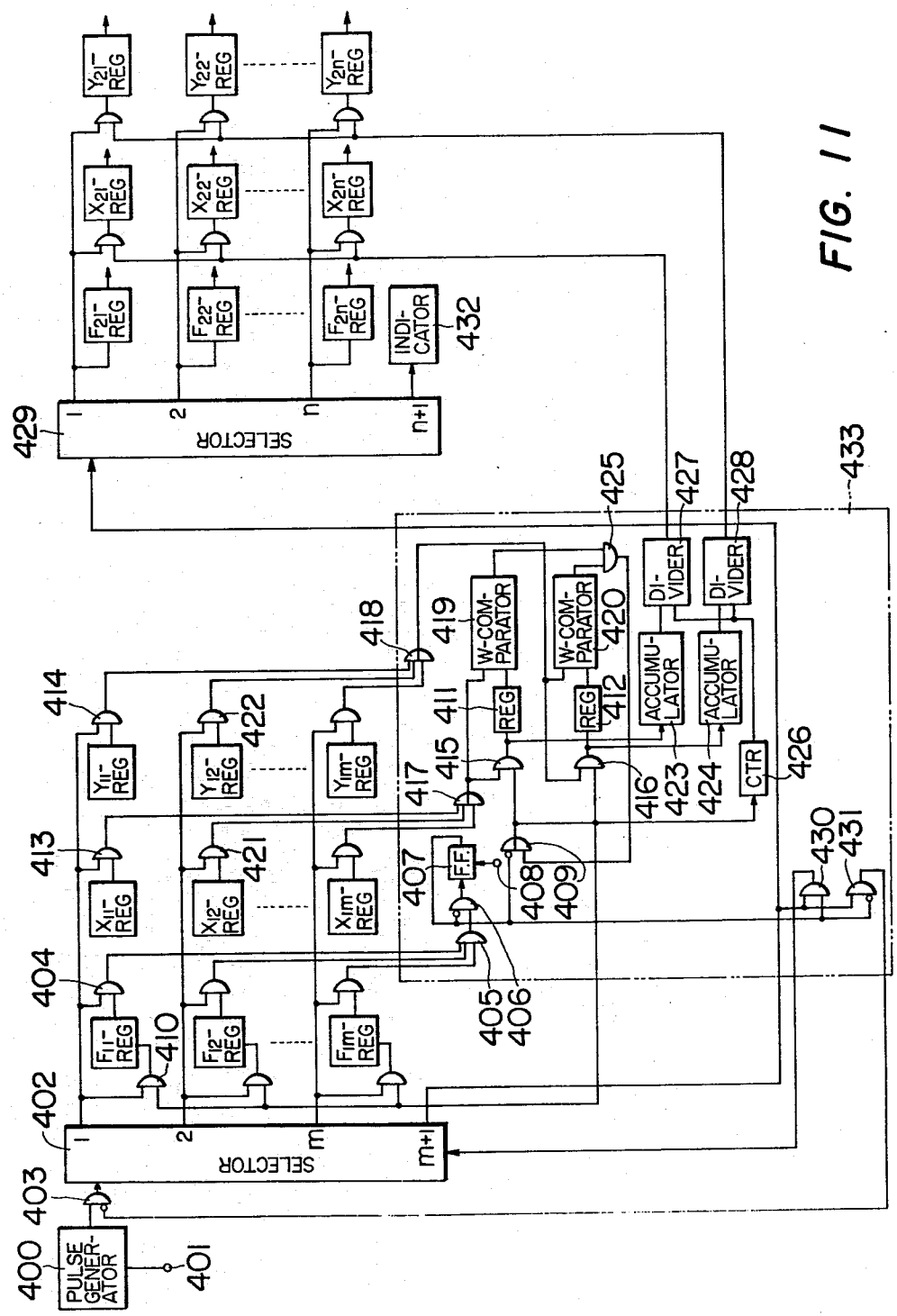

The detailed configuration of the memory circuit 120A is shown in FIGS. 10 and 11. In FIG. 10 the X-position, the Y-position and the output of the discriminator 113A are supplied to terminals 300, 301, and 302, respectively. The output signal applied to the terminal 302 is supplied to a selector 304 through a NAND gate 303 to select either one of channels 1, 2, . . . , $m$, $m + 1$ to be stored. Each of $X_{11}$, $X_{12}$, . . . , $X_{1m}$ registers stores the X-position and each of $Y_{11}$, $Y_{12}$, . . . , $Y_{1m}$ registers stores the Y-position. Each of $F_{11}$, $F_{12}$, . . . , $F_{1m}$ registers is used to indicate the stored channel, in general, one bit register. The positions of m pieces of the partial image patterns are stored in the registers $X_{11}$ through $X_{1m}$ and in the registers $Y_{11}$ through $Y_{1m}$ and then, when the $(m + 1)$ the output is supplied to the terminal 302, the selector 304 outputs a signal to a line 306, whereby the NAND gate 303 is closed and an indicator 305 is actuated to indicate over-flow of the memories. A circuit, which reads out the contents of the respective registers in FIG. 10 is shown in FIG. 11, which will be explained below.

A grouping circuit 121A groups a plurality of the partial image patterns into groups of the partial image patterns, each of which is within the predetermined distance $L_{max}$ in the distance therebetween and the average positions of each of the groups are calculated. The output of the grouping circuit 121 is stored in a memory circuit 122A. The detailed configurations of the grouping and the memory circuits 121A and 122A are shown in FIG. 11.

In FIG. 11 a pulse generator 400 is triggered by a vertical synchronizing pulse applied to a terminal 401 and generates clock pulses during a fly-back period of the picture tube 104. The clock pulses are supplied to a selector 402 through a NAND gate 403 and the channel in the memory circuit 120A is selected in the order of 1, 2, . . . , m, in order to read out the contents of the registers. First of all, in a case where the clock pulse is applied to the channel 1, the content 1 of the $F_{11}$ register is supplied to a flip-flop circuit 407 through AND gate circuits 404 and 405, and a NAND gate circuit 406 where the flip-flop circuit 407 is initially set to zero by a terminal 408. At the same time, the $F_{11}$ register is reset by a reset signal passing through an AND gate reset circuit 410, the reset signal being obtained as an output circuit 410 and the contents of the $X_{11}$ and $Y_{11}$ registers are stored to registers 411 and 412 and to accumulators 423 and 424, respectively, and through AND gate circuits 413, 414, 415 and 416, and OR gate circuits 417 and 418, since the content of the flip-flop circuit 407 is zero in an initial condition.

Next, the clock pulse is applied to the channel 2 and at this time, the content of the flip-flop 407 has been changed from 0 to 1. Therefore, the output of the OR gate circuit 409 is 0 and the AND gate circuits 415 and 416 are closed. As a result, the contents of the $X_{12}$ and $Y_{12}$ registers are supplied to window comparator 419 and 420, respectively, through AND gates 421 and 422, and the OR gates 417 and 418, in which the contents of the $X_{12}$ and $Y_{12}$ registers are compared with those of the registers 411 and 412. The window comparator 419, which is well known, discriminates whether a compared result between the contents of the $X_{12}$ register and the register 411 is smaller than a predetermined value $XL_{max}$ which corresponds to the X axial component of the predetermined distance $L_{max}$. The window comparator 420, which is well known, discriminates whether a compared result between the contents of the $Y_{12}$ register and the register 412 is smaller than a predetermined value $YL_{max}$ which corresponds to the Y axial component of the predetermined distance $L_{max}$. When the outputs of the window comparators 419 and 420 are obtained at the same time, the output of an AND gate 425 opens the AND gates 415 and 416, so that the contents of the registers 411 and 412 are rewritten by the contents of the $X_{12}$ and $Y_{12}$ registers and at the same time the contents of the $X_{12}$ and $Y_{12}$ registers are supplied to the accumulators 423 and 424, whereas, when the outputs of the window comparators 419 and 420 are not obtained at the same time or either one of the outputs thereof is not obtained, the contents of the registers 411 and 412 are not changed and are compared with the contents of the next channel. The $F_{1m}$ register corresponding to the $X_{1m}$ and $Y_{1m}$ registers having been read out is reset, where $m = 1, 2, \ldots$. As have been described above, the m channels of the memory circuit 120A in turn are selected by the selector 402, so that a number of the partial image patterns, each of which is within the predetermined distance $L_{max}$, is counted by a counter 426 and all the X and Y positions of these partial image patterns are accumulated in the accumulators 423 and 424, respectively. Then, average positions of these partial image patterns are calculated by dividers 427 and 428.

Next, when the selector 402 actuates the $(m + 1)$th channel, a selector 429 of the memory circuit 122A selects a first channel so that the X and Y average positions, which are the outputs of the dividers 427 and 428, are stored in $X_{21}$ and $Y_{21}$ registers of the memory circuits 122A and a $F_{21}$ register is set 1 in order to indicate that the first channel is written in, whereby one group of the partial image patterns is elected and stored in the memory circuit 122A. At the same time, the flip-flop circuit 407 is reset and a pulse passing through an AND gate 430 is applied to the selector 402, so that the selector 402 selects the respective channels, in each of which the content of the $F_{1m}$ register is 1 in order to elect other group of the partial image patterns. When all the groups of the partial image patterns are elected, the content of the flip-flop 407 does not become 1 any longer, so that a signal applied to the $(m + 1)$th channel is supplied to the NAND gate 403 through a NAND gate 431, and the NAND gate 403 is closed. As a result, the contents of the memory circuit 120A are grouped and are stored in the $X_{2n}$ and $Y_{2n}$ registers of the memory circuit 122A, where $n = 1, 2, \ldots$. A $F_{2n}$ register is set to 1 when the $X_{2n}$ and $Y_{2n}$ registers are written in. A reference numeral 432 is an over-flow indicator. Since memory circuits 120B, 120C, and 120D, grouping circuits 121B, 121C, and 121D and memory circuits 122B, and 122C, and 122D are constructed in the same manner, the detailed constructions and operations thereof will be omitted from the description.

Figure 12:
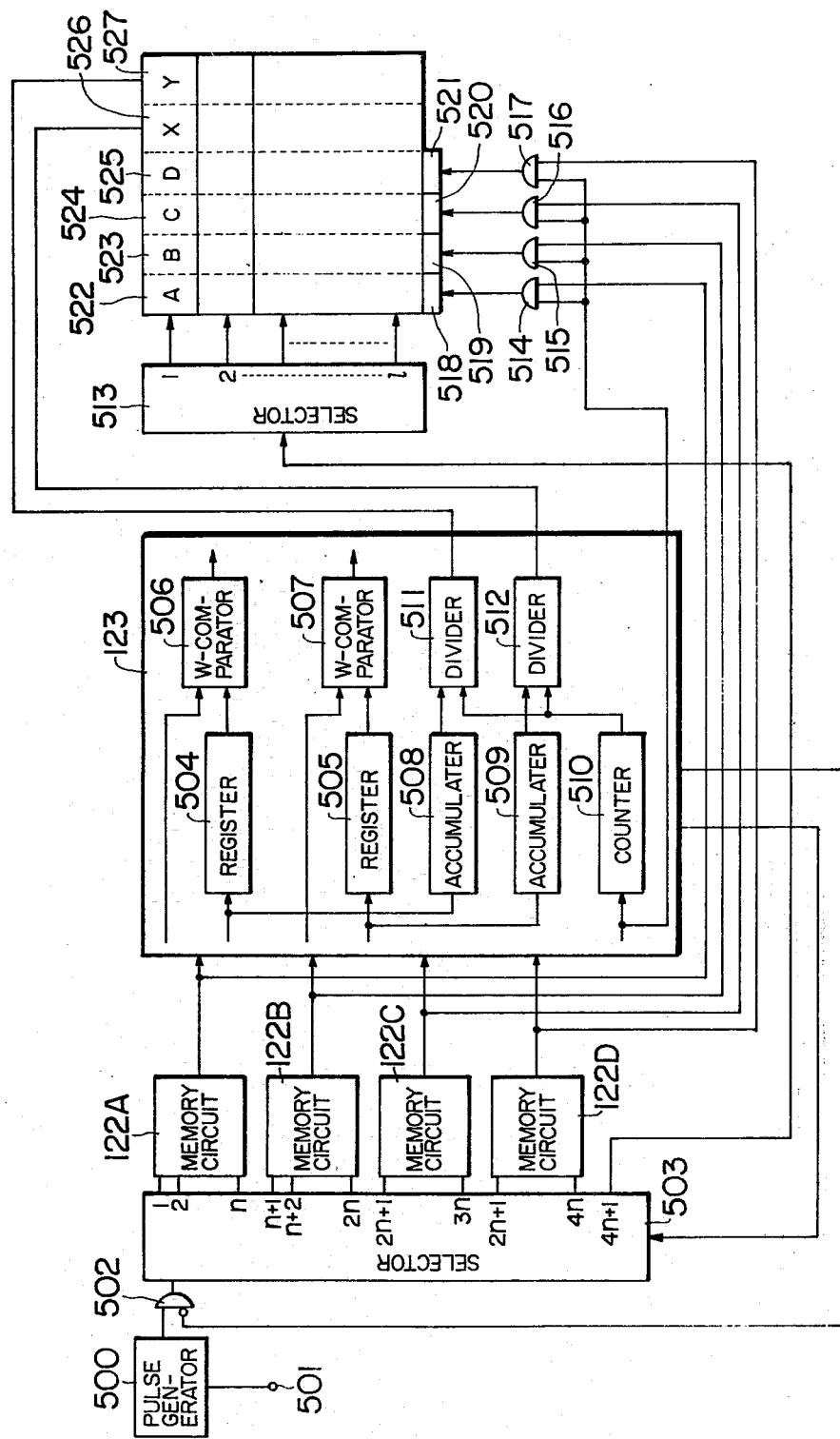

Now, the constructions and operations of the memory circuits 122A, 122B, 122C, and 122D, a grouping circuit 123 and a memory circuit 124 will be explained in more detail in connection with FIG. 12. The construction and the operation of an apparatus shown in FIG. 12 are similar to those shown in FIG. 11. A pulse generator 500 is actuated by a vertical synchronizing pulse applied to a terminal 501 and supplies clock pulses to a selector 503 through a NAND gate 502 in order to select each channel of the memory circuits 122A, 122B, 122C, and 122D, the construction of each of which is similar to that of the memory circuit 120A shown in FIGS. 10 and 11. The respective memory circuits 122A, 122B, 122C, 122D store the respective groups of the partial image patterns, each of which is within the predetermined distance $L_{max}$ and corresponds to the substandard pattern A, B, C, or D. The content of the each register of the each memory circuit, in turn, is supplied to the grouping circuit 123 in order to elect respective groups of the partial image patterns, each of which is within the predetermined distance $M_{max}$ in a distance therebetween. Since the detailed construction of the grouping circuit 123 is similar to a circuit 433 surrounded by a dotted line shown in FIG. 11, the description thereof will be omitted and only the important portions are illustrated in FIG. 12.

In the grouping circuit 123, the contents of the X and Y registers are stored in registers 504 and 505, respectively, and compared with the contents of other X and Y registers in window comparators 506 and 507 which are well known. The threshold of the window comparator 506 is set to a predetermined value $XM_{max}$ which corresponds to the X axial component of the predetermined distance $M_{max}$ and the threshold of the window comparator 507 is set to a predetermined value $YM_{max}$ which corresponds to the Y axial component of the predetermined distance $M_{max}$. The X and Y positions of the partial image patterns in the same group are accumulated in accumulators 508 and 509. A counter 510 counts a number of the partial image patterns which are supplied to the accumulators 508 and 509. The average positions X and Y of one group of the partial image patterns are outputted from dividers 511 and 512 and stored in the first channel of the memory circuit 124 due to the fact that a selector 513, which is actuated by the $(4m+1)$th channel of the selector 503, elects it.

On the other hand, in order to discriminate which group of the substandard patterns A, B, C, and D the partial image pattern supplied to the accumulators 508 and 509 is outputted from, the outputs of the memory circuits 122A, 122B, 122C, and 122D and the input supplied to the counter 510 are supplied to respective registers 518, 519, 520, and 521 through respective AND gates 514, 515, 516, and 517. Accordingly, the register corresponding to the partial image pattern supplied to the accumulators 508 and 509 is set to 1, for example, when the X and Y positions of the partial image pattern from the memory circuit 122A are supplied to the accumulators 508 and 509, the register 518 is set to 1. Then, when the selector 513 elects the first channel, the contents of the registers 518 through 521 and the outputs of the dividers 511 and 512 are stored in registers 522 through 527 of the memory circuit 124, respectively. In the same manner, when the selector 503 selects the channel repeatedly, the selector 513 is actuated in response to the operation of the selector 503 and all groups of the partial image patterns are stored in the registers of the memory circuits 124 due to the fact that the selector 513 selects respective channels 1 through l, where l = 1, 2 . . . .

Accordingly, if the registers 522 through 525, for instance, corresponding to the substandard patterns A, B, C, and D are set to 1, the hole is detected and the X and Y positions of the hole in the X-Y coordinate system are the X and Y positions stored in the registers 526 and 527.

On the other hand, when the portion of the hole is stored in the memory circuit 124, i.e., a part of the registers corresponding to the substandard patterns A, B, C, and D are set to 1 and the other registers are set to 0, the portion of the hole is detected as follows.

Figure 13:
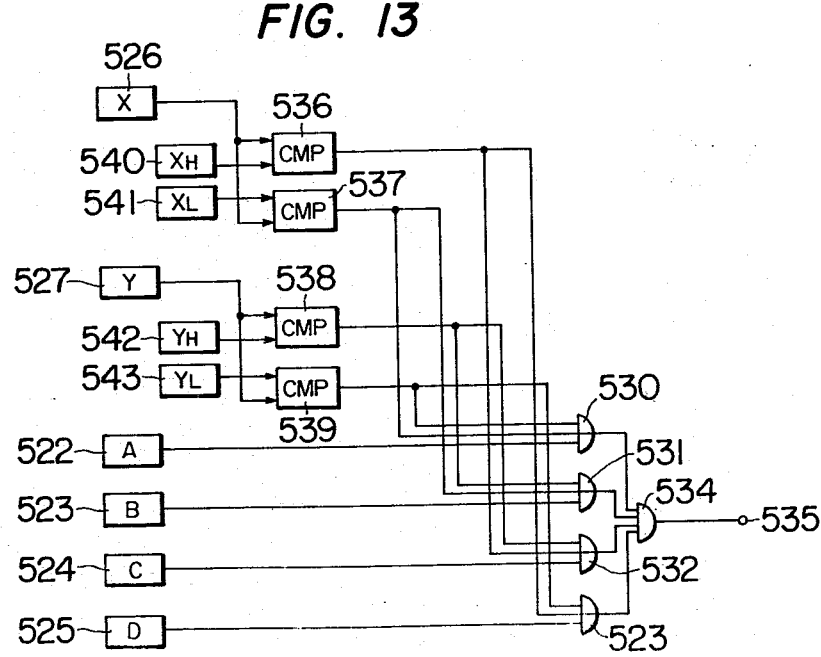
FIG. 13 is a schematic block diagram of the portion of a modified embodiment of this invention.

Referring now to FIG. 13, the registers 522 through 527 correspond to the registers of the first channel in the memory circuit 124. For simple description, only the first channel of the memory circuit 124 is indicated here as an example, but it is needless to say that the same constructions are taken in the other channels thereof. The outputs of the registers 522 through 523 are supplied to an AND gate 534 through OR gates 530 to 533 and the output of the AND gates 534 is obtained from a terminal 535. On the other hand, the outputs of the registers 526 and 527 are supplied to comparators 536 and 539. Registers 540 and 541 are preset to portions $X_H$ and $X_L$ shown in FIG. 6, respectively, and registers 542 and 543 are preset to positions $Y_H$ and $Y_L$ shown in FIG. 6, respectively. The outputs of the comparators 536 and 539 are supplied to the AND gate 534 through the OR gates 530 to 533 as shown in FIG. 13. The output of each of the comparators 536, 537, 538, or 539 is 1 when the position of the upper input terminal thereof is larger than that of the lower input terminal thereof in the X-Y coordinate system, whereas the output thereof is 0 in the reversed relationship. Assuming that, for instance, the portion of the hole is placed in the leftmost-middle position of the image pattern, i.e., an area indicated by D and C in FIG. 6, the registers 524 and 525 are set to 1 and the registers 526 and 527 store the X and Y positions of the portion of the hole. Accordingly, the comparator 537 outputs 1 and the comparators 536 and 538 and 539 output 0. As a result, though the registers 522 and 523 are 0, the output of the AND gate 534 is obtained and the portion of the hole can be detected.

The above embodiment of this invention recognizes the hole due to the first method for the pattern recognition, but next, an embodiment of this invention due to the second method will be explained below.

Figure 14:
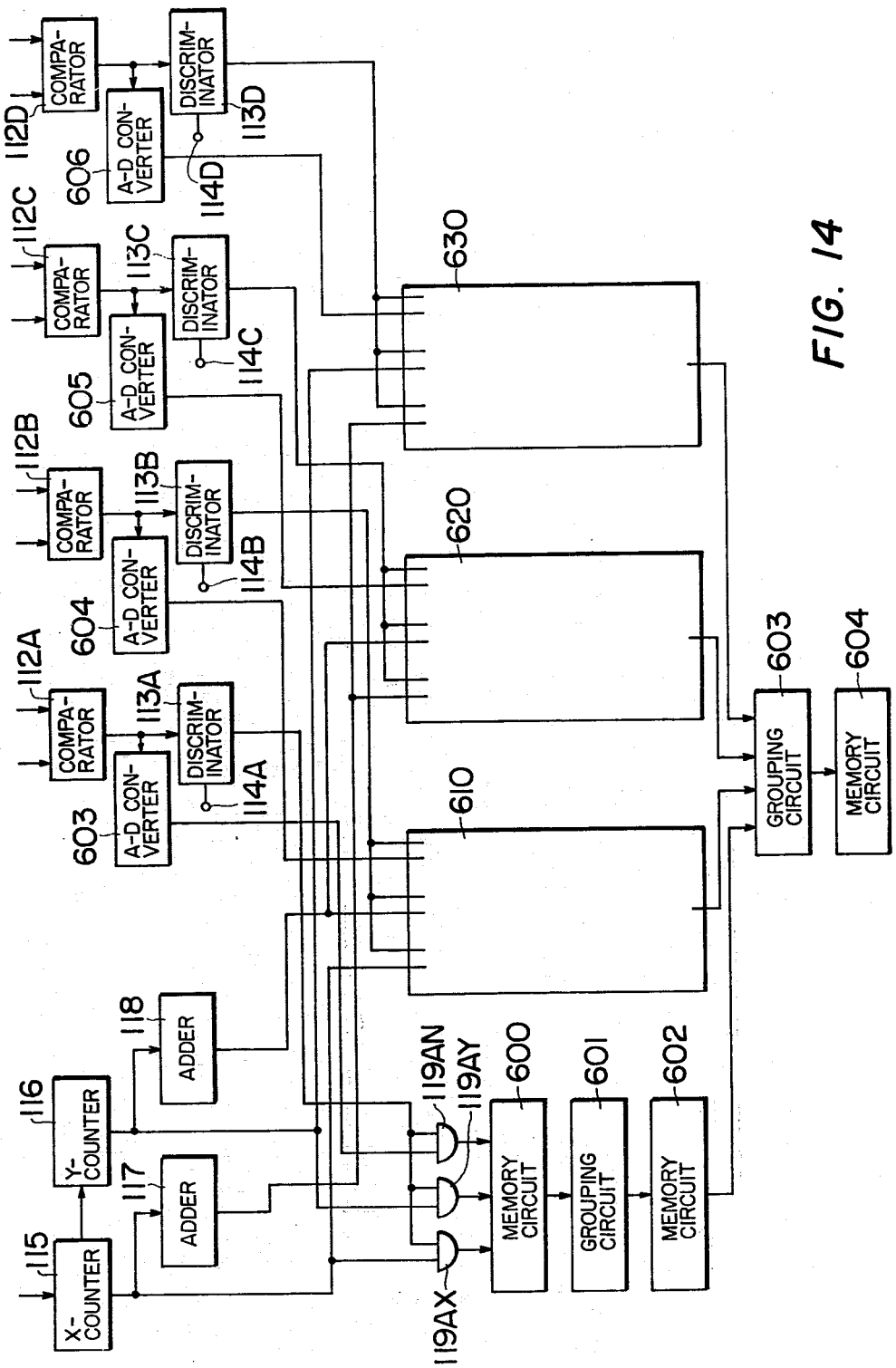
FIG. 14 is a schematic block diagram of a further modified embodiment of this invention.
Figure 15:
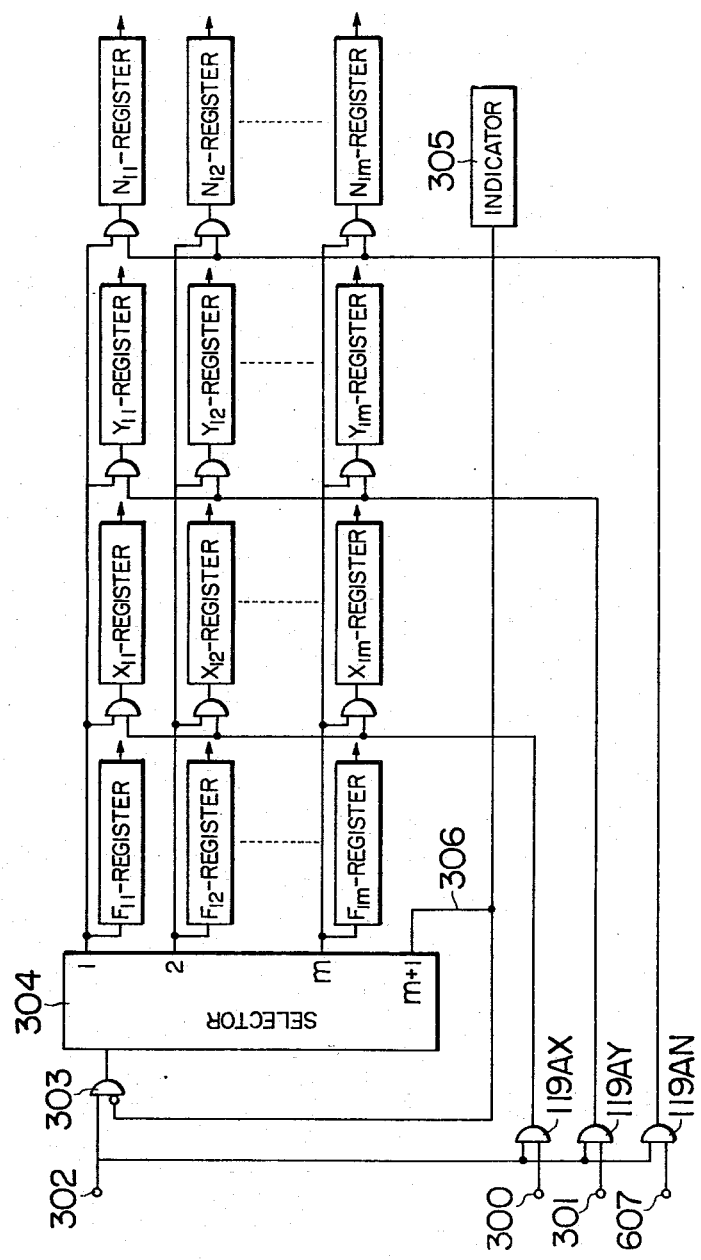
FIGS. 15 and 16 are detailed block diagrams of the portions of the embodiment shown in FIG. 14.

Referring now to FIg. 14, in which the same elements as those in FIG. 7 are designated by the same reference numerals, the portion of the patterns recognition system, which is common with that in FIG. 7, is omitted for simplicity of explanation. A memory circuit 600 includes registers for storing the X and Y positions shown in FIG. 10 and further includes registers for storing the number N of the picture elements corresponding to disagreement. The partial detailed construction of the memory circuit 600 is shown in FIG. 15, in which the same elements as those in FIGS. 7 and 10 are designated by the same reference numerals. Referring back to FIG. 14, the output of the comparator 112A is supplied to an A-D converter 603 in which it is converted into a digital signal for a digital processing thereafter. This can be realized due to the fact that the divided voltage of the resistors $v$ and the resistor R is applied to the A-D converter 603, for instance. The output of the A-D converter 603, which is the digitalized signal of the number N shown in the table 1, for instance, is supplied to an AND gate 119AN and is stored in the memory circuit 600 in response to the output of the discriminator 113A. In other words, when the X and Y positions of the partial image pattern are stored in the memory circuit 600, the number N corresponding to this partial image pattern is stored therein. In more detail, the output of the A-D converter 603 is applied to a terminal 607 shown in FIG. 15 and, in turn, is stored in $N_{1m}$ register in response to the output of the discriminator 113A and the channel selection of the selector 304. The description of the operation of FIG. 15 will be omitted since it is similar to that of FIG. 10.

Figure 16:
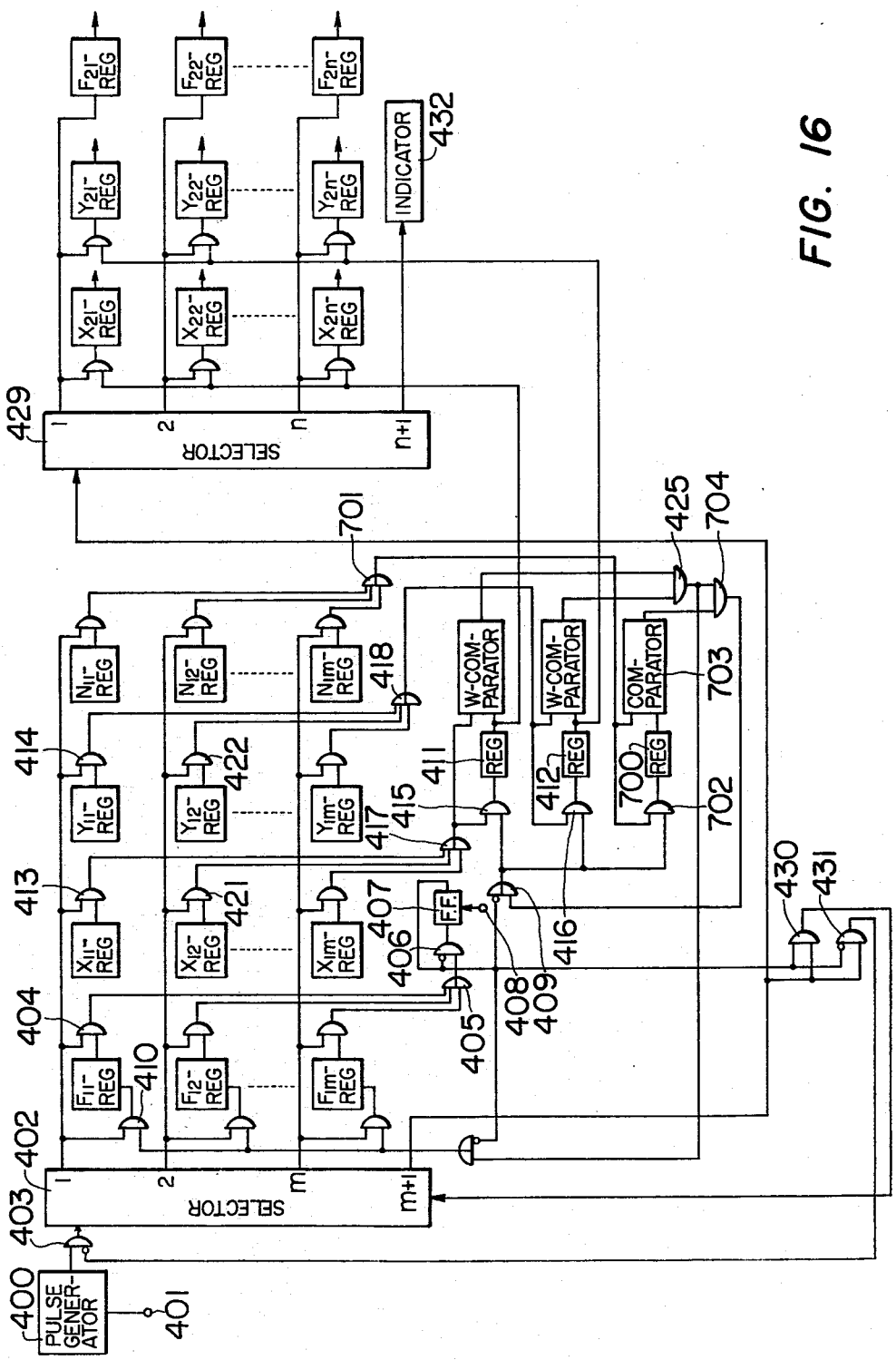

Next, the constructions and the operations of the memory circuit 600, a grouping circuit 601 and a memory circuit 602 will be be explained in connection with Fig. 16, in which the same elements as those in FIG. 11 are designated by the same reference numerals. The comparison between the positions of the partial image patterns which are stored in the $X_{1m}$ and $Y_{1m}$ registers is performed in the window comparators 419 and 420 as has been described in FIG. 11, the outputs of which are supplied to the AND gate 425. On the other hand, the content of the $N_{11}$ register shown in FIG. 15 is stored in a register 700 through an OR gate 701 and an AND gate 702, to which the output of the NOR gate 409 is supplied. Then, the content of the register 700 is compared with the content of a $N_{12}$ register in a comparator 703. If the content of the $N_{12}$ register is smaller than that of the register 700 equivalent to that of the $N_{11}$ register, and the outputs of the window comparators 419 and 420 are obtained at the same time, an AND gate 704 outputs a rewritting pulse, by which the contents of the registers 411, 412, and 700 are rewritten to the contents of the $X_{12}$ register, the $Y_{12}$ register and the $N_{12}$ register, respectively. In the same manner, the comparison of the contents of all the registers in the memory circuit 600 is performed in response to the channel scanning of the selector 402. As a result, the X and Y positions of the partial image pattern, which belongs in one group of the partial image patterns within the predetermined distance $L_{max}$ and corresponds to the minimum of the number N, are stored in the registers 411 and 412. Then, when the selector 402 elects the $(m + 1)$th channel, the contents of the registers 411 and 412 are supplied to the $X_{21}$ and $Y_{21}$ registers and stored therein in response to the election of the selector 429. An $F_{21}$ register stores 1 to indicate that the $X_{21}$ and $Y_{21}$ registers are written in. Similarly, the positions representative of a plurality of the groups of the partial image patterns, in turn, are stored in the $X_{2n}$ and $Y_{2n}$ registers of the memory circuit 602 and an $F_{2n}$ register stores 1 where $n = 1, 2, \ldots$.

Referring back to FIG. 14, the constructions of A–D converters 604, 605, and 606 are equivalent to that of the A–D converter 603 as has been described above, the outputs of which are supplied to memory circuits of circuits 610, 620, and 630 in order to store the number N corresponding to the substandard patterns B, C, and D. Since the detailed constructions of the circuit 610, 620, and 630 are similar to a circuit comprising the gate circuits 119AX, 119AY and 119AN, the memory circuits 600 and 602, and the grouping circuit 601 as have been described above, they are omitted in FIG. 14. The contents of the memory circuit 602 and the other memory circuits of the circuits 610, 620, and 630 are grouped by a grouping circuit 603 to a plurality of the groups of the partial image patterns, each of which is within the predetermined distance $M_{max}$ in a distance therebetween and then the average positions of these groups are stored in a memory circuit 604. The detailed constructions and operations of the memory circuit 602, the grouping circuit 603, and the memory circuit 604 will be omitted since they are similar to those of FIG. 12.

Figure 17:
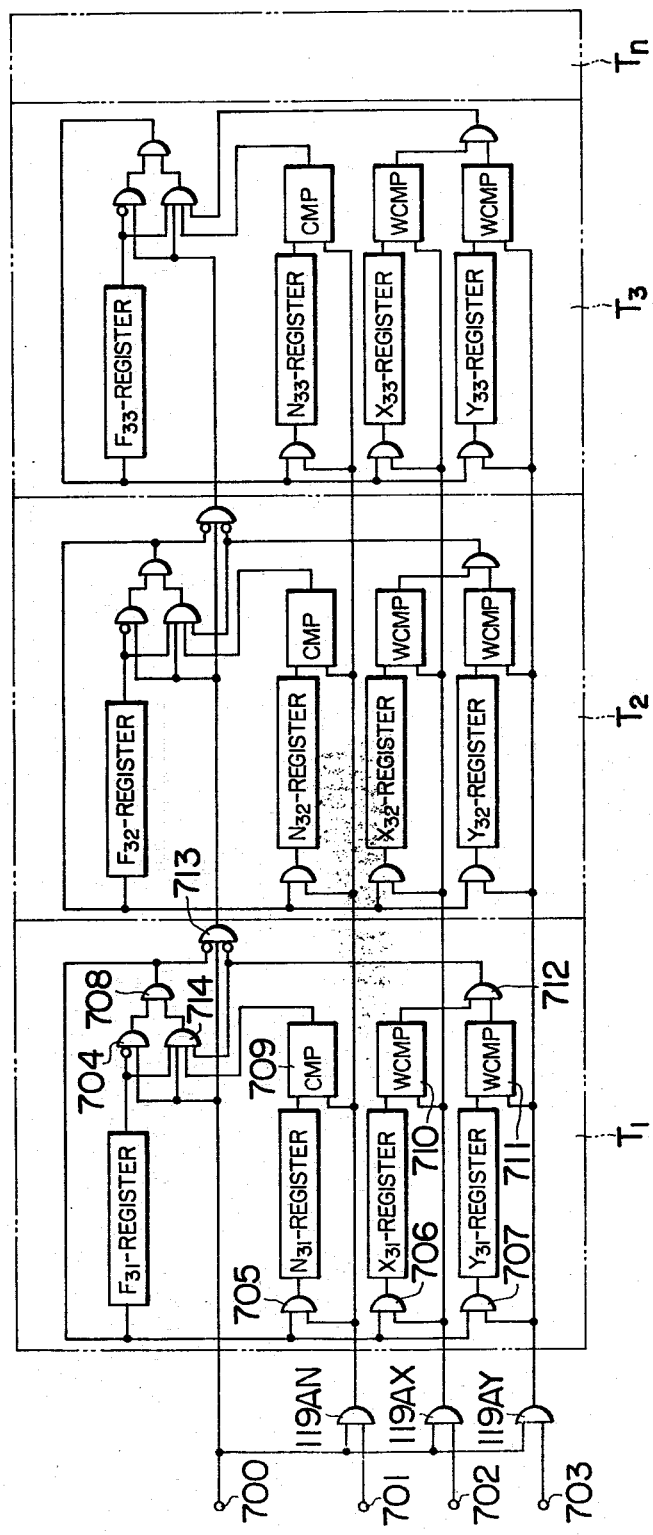
FIG. 17 is a schematic block diagram of a still further modified embodiment of this invention.

FIG. 17 shows a modified embodiment of the second method of this invention, in which the outputs of the discriminator 113A and the A-D converter 603 and the X and Y position signals from the counters 115 and 116 in FIG. 14 are supplied to terminals 700, 701, 702, and 703. This embodiment has a plurality of stages $T_1, T_2, \ldots, T_n$, each of which can store the X and Y position of the partial image pattern which corresponds to the minimum number N in the one group of the partial patterns within the predetermined distance $L_{max}$. In other words, this embodiment can decrease a great number of the registers in the memory circuit 600 since it is unnecessary to store the X and Y positions of all the partial image patterns in response to the output of the discriminator 113A and the registers of the memory circuit 600 are commonly used with the registers of the memory circuit 602.

First of all, by the output signal of the discriminator 113A applied to the terminal 700, a NAND gate 704 outputs 1 while an $F_{31}$ register is initially set to 0. The output 1 of the NAND gate 704 is supplied to AND gates 705, 706, and 707 through an OR gate 708. Accordingly, the number N and the X and Y positions of the partial image pattern are written in $N_{31}, X_{31}$ and $Y_{31}$ registers, respectively at a time that the output signal of the discriminator 113A is output, and at the same time, the content of the $F_{31}$ register is changed from 0 to 1.

Next, when the next output signal of the discriminator 113A appears on the terminal 700, the contents of the $N_{31}, X_{31}$ and $Y_{31}$ registers are compared with signals applied to the terminals 701, 702, and 703 in a comparator 709 and window comparators 710 and 711, respectively, which are well known. The comparator 709 outputs 1 when the signal applied to the terminal 701, which corresponds to the number N, is smaller than the content of the $N_{31}$ register. The window comparator 710 outputs 1 when the compared result between the content of the $X_{31}$ register and the X position signal applied to the terminal 702 is within the predetermined value $XL_{max}$ which is an X-axial component of the predetermined distance $L_{max}$, and the window comparator 71 outputs 1 when the compared result between the content of the $Y_{31}$ register and the Y position signal applied to the terminal 703 is within the predetermined value $YL_{max}$ which is a Y-axial component of the predetermined distance $L_{max}$. Therefore, when the output of the discriminator 113A is supplied to the terminal 700 and all the outputs of the comparator 709 and the window comparators 710 and 711 are obtained. An AND gate 714 outputs a rewritting signal, by which the AND gates 705, 706, and 707 are opened, so that the $N_{31}, X_{31}$ and $Y_{31}$ registers are rewritten with the signals of the terminals 701, 702, and 703.

Now, if at least one output of the comparator 709 and the window comparators 710 and 711 is not obtained, a NAND gate 713 is opened, so that the signals of the terminals 701, 702, and 703 are written in $N_{32}$, $X_{32}$ and $Y_{32}$ registers of a next stage $T_2$ as well. The same operation as that of the stage $T_1$ is performed in the stage $T_2$, and in the stage $T_n$ as well, where $n = 1, 2, \ldots$. As a result, the each stage stores the X and Y position representative of the partial image pattern which corresponds to the minimum number N in the one group of the partial image patterns grouped within the predetermined distance $L_{max}$. Although the embodiment relating to only the substandard pattern A has been described in FIG. 17, the same construction as this embodiment will be applicable to circuits relating to the substandard patterns B, C, and D.

When all the partial image patterns are grouped, the contents of the $X_{3n}$ and $Y_{3n}$ registers in FIG. 17 are equivalent to the contents of the $X_{2n}$ and $Y_{2n}$ registers of the memory circuit 602 in FIG. 14. Therefore, an apparatus shown in FIG. 12, in which the $X_{3n}$ and $Y_{3n}$ registers are substituted for the memory circuit 122A, for instance, can be utilized for the recognition of the hole and the calculation of the center position thereof.

While only a few forms of the present invention have been shown and described, many modifications will be apparent to those skilled in the art within the spirit and scope of the invention as set forth in the appended claims.

What is claimed is:

1. A pattern recognition system comprising:
    image pickup means for sequentially scanning an image of an object to produce first signals representative thereof;
    first means, responsive to said first signals, for generating second signals representative of partial image patterns of a two-dimensional pattern of said object as sequentially scanned by said image pickup means;
    second means for forming a plurality of two dimensional substandard patterns, each of which approximately corresponds to selected portion of the two-dimensional pattern of said object;
    third means, responsive to the scan of said object by said image pickup means, for generating third signals representative of the respective sequential positions of said partial image patterns;
    fourth means, coupled to said first means and said second means, for comparing said each partial image pattern with said respective substandard patterns, and for extracting said each partial image pattern which is within a predetermined degree of coincidence with said substandard pattern;
    fifth means, coupled to said third means, for storing positions representative of said respective partial image patterns in response to the outputs of said fourth means; and
    sixth means, coupled to said fifth means, for grouping said respective partial image patterns to groups of said partial image patterns, in each of which the distances between the positions representative of said partial image patterns are within a predetermined distance from each other in a two-dimensional coordinate system, and for calculating the coordinate of specific positions of said object in the two-dimensional coordinate system from the groups of said partial image patterns.

2. A pattern recognition system according to claim 1 wherein said second means comprises memory means for storing signals representative of the plurality of said substandard patterns.

3. A pattern recognition system according to claim 1 wherein said first means comprises first and second groups of shift registers, said first group of the shift registers coupled to said image pickup means, each of which is serially connected, said second groups of the shift registers coupled to said first group, each of which has output terminals, and being so designed that said partial image patterns, in turn, are cut out from said two-dimensional pattern, and said second and fourth means comprise connecting means coupled to said output terminals of said first grouped shift registers with a relationship such that said respective substandard patterns are formed by connections between said connecting means and said output terminals, resistors coupled to said connecting means and comparing means coupled to said resistors, said comparing means providing threshold levels each of which corresponds to the predetermined degree of coincidence between said partial image pattern and said each substandard pattern.

4. A pattern recognition system according to claim 1 wherein said first means outputs said partial image patterns as a plurality of picture elements, the number of which is equivalent to a number of picture elements of said each substandard pattern, and said fourth means compares the picture elements of said each partial image pattern with the picture elements of said respective substandard patterns in corresponding positions, said fourth means comprising;
    signal generating means for generating third signals corresponding to the number of the picture elements which the picture elements of said each partial image pattern disagree with those of said respective substandard patterns; and
    comparing means, coupled to said signal generating means for outputting fourth signals in a case where said number of the picture elements is smaller than a predetermined number $N_{max}$.

5. A pattern recognition system according to claim 4 wherein said sixth means comprises:
    seventh means, coupled to said fifth means, for grouping said partial image patterns to first groups of partial image patterns every substandard pattern, in each of which the distances between the positions representative of said partial image patterns in the coordinate system are within a predetermined distance $L_{max}$ from each other, and for calculating the average positions representative of said respective first groups; and
    eighth means, coupled to said seventh means, for further grouping said grouped partial image patterns to second groups of partial image patterns, in each of which the distances between the positions representative of said partial image patterns in the coordinate system are within a predetermined distance $M_{max}$ from each other, and for calculating the average positions representative of said respective second groups.

6. A pattern recognition system according to claim 4 wherein said fifth means further includes memory means, coupled to said signal generating means for said third signals, for storing said third signals in response to said fourth signals from said comparing means.

7. A pattern recognition system according to claim 6 wherein said sixth means comprises:
    ninth means, coupled to said fifth means, for grouping said partial image patterns to first groups of partial image patterns every substandard pattern, in each of which the distances between the positions representative of said partial image patterns in the coordinate system are within a predetermined distance $L_{max}$ from each other, and for extracting the respective positions representative of said first groups, each of said respective position representative of said first groups being the representative position of the partial image pattern which has the minimum number of said picture elements corresponding to disagreement; and tenth means, coupled to said ninth means, for further grouping said grouped partial image patterns to second groups of partial image patterns, in each of which the distances between the positions representative of said partial image patterns in the coordinate system are within a predetermined distance $M_{max}$ from each other, and for calculating the average positions representative of said respective second groups.

8. A pattern recognition system according to claim 7, wherein said ninth means sequentially compares the positions of said partial image patterns from said third means with the stored positions of the previous partial image patterns in order to discriminate whether the distances therebetween in the coordinate system are within the predetermined distance $L_{max}$, and at the same time, discriminate whether the number of the picture elements corresponding to disagreement, in said each partial image pattern is smaller than that in said each previous partial image pattern, whereby said stored positions and said numbers of the previous partial image patterns are renewed.

9. A pattern recognition system accordng to claim 1, further including discriminating means coupled to said sixth means, said discriminating means comprising:

eleventh means for storing predetermined X and Y positions in the two-dimensional coordinate system in order to recognize the portions of said object, and twelfth means, coupled with said eleventh means, for discriminating that said specific positions are of said object to be recognized in comparison with said predetermined X and Y positions.

* * * * *